United States Patent
Kugele et al.

(10) Patent No.: US 6,910,676 B2
(45) Date of Patent: Jun. 28, 2005

(54) DISPLACEMENT NUT FOR A LIFTING DEVICE, AND CORRESPONDING LIFTING DEVICE

(75) Inventors: Karl-Heinz Kugele, Schömberg (DE); Reinhold Endres, Holzerath (DE); Lothar Bai, Panzweiler (DE); Guido Naumes, Morscheid (DE); Ferdinand Alten, Mandern (DE); Peter Brosius, Ayl (DE)

(73) Assignees: ThyssenKrupp Bilstein GmbH, Ennepetal (DE); Ensinger GmbH, Nufringen (DE)

( * ) Notice: Subject to any disclaimer, the term of this patent is extended or adjusted under 35 U.S.C. 154(b) by 76 days.

(21) Appl. No.: 10/415,315
(22) PCT Filed: Sep. 5, 2001
(86) PCT No.: PCT/EP01/10201
§ 371 (c)(1), (2), (4) Date: Apr. 25, 2003
(87) PCT Pub. No.: WO02/36477
PCT Pub. Date: May 10, 2002

(65) Prior Publication Data
US 2004/0046159 A1 Mar. 11, 2004

(30) Foreign Application Priority Data
Oct. 31, 2000 (DE) .......................... 100 53 860

(51) Int. Cl.$^7$ .................................................. B25B 1/04
(52) U.S. Cl. ................................................... 254/126
(58) Field of Search .............................. 254/126, 133, 254/122

(56) References Cited

U.S. PATENT DOCUMENTS 5,184,806 A * 2/1993 Erschens et al. ............ 254/126
5,217,206 A * 6/1993 Brosius et al. .............. 254/126

* cited by examiner

Primary Examiner—Lee D. Wilson
(74) Attorney, Agent, or Firm—Max Fogiel

(57) ABSTRACT

A motion nut for a lifting device, especially a car jack, in which a basic body has an internal thread and a threaded spindle is seated in the internal thread. The basic body together with the internal thread is a single unit component formed of at least two separate material components of different materials. The two separate material components form an internal thread region part and an external part, so that properties of the internal thread region is selectable different from properties of the external part. The properties of the thread being selectable for reduced friction and the properties of the external part being selectable for increased strength and stiffness.

20 Claims, 1 Drawing Sheet

DISPLACEMENT NUT FOR A LIFTING DEVICE, AND CORRESPONDING LIFTING DEVICE

BACKGROUND OF THE INVENTION

The invention relates to a motion nut for a lifting device, especially a mechanical car jack, comprising a basic body, which is provided with an internal thread for seating a threaded spindle.

The EP-B 0320613 relates to a car jack with a platform leg, at which a supporting arm, which can be swiveled about a horizontal axis, is hinged and which is engaged by a threaded spindle, which is mounted at the platform leg in an articulated fashion with a plastic spindle nut, which engages, with stud axles, bearing recesses of the platform leg form as a shaped sheet-metal part. A metal bracket is connected positively with the plastic spindle nut and has, at its ends, the stud axles of the spindle nut in the region of the bearing recesses of the supporting segments covering the platform leg. Disadvantageously, it may be noted here that the region, accommodating the threaded spindle, must be reinforced by a further component (metal bracket), structural changes also having to be made to the plastic spindle nut, so that the two components can be positioned accurately relative to one another.

A similar construction is described in the EP-A 0340551. The spindle nut consists of a plastic body, which interacts with a metallic reinforcing element. The reinforcing element comprises a sleeve-like projection of the plastic body and is constructed as a sheet-metal ring. The criteria, which apply here, are identical with those already described.

A spindle nut connection can be inferred from U.S. Pat. No. 2,664,023. The region of the spindle nut is formed here by a two-part sleeve, the two parts of which are connected together by means of a spring element and over which a one-part bushing, having an internal contour corresponding to the sleeve accommodation region, is pushed later on. Aside from the tolerances, which must be maintained here between the threaded spindle and the divided, threaded nut, this type of structural configuration of a motion nut must be regarded as cumbersome and component-intensive.

SUMMARY OF THE INVENTION

It is therefore an object of the invention to develop a motion nut for a lifting device which, while simple to construct, nevertheless has good sliding and friction properties in the spindle region and, at the same time, ensures an optimum tensile load and torque support in the region of the lifting device. Moreover, a lifting device, especially a mechanical car jack, is to be optimized so that, while having good sliding and friction properties in the spindle mounting area, nevertheless provides optimum tensile loads and a torque support to the body of the lifting device, a reduction in the number of components, in comparison to the state of the art, being brought about.

Pursuant to the invention, this objective is accomplished owing to the fact that the basic body is provided as a one-part component, which is formed by at least two material components.

Advantageous further developments of the object of the invention can be inferred from the associated dependent claims.

This objective is also accomplished by a lifting device, especially a mechanical car jack, comprising at least one stand element and at least one lifting element, which are connected with one another over at least one motion nut, which accommodates a threaded spindle, and, optionally, a counter-bearing, the motion nut being formed by at least two material components.

For the advantageous developments of the inventive lifting device can be inferred from the associated the dependent claims.

The object of the invention preferably is used for mechanical car jacks, other application cases in the area of motor-driven lifting devices also being conceivable. Due to the inventive object, additional reinforcing elements become dispensable, so that new customer requirements with regard to higher grade static stresses as well as increased dynamic stresses can be realized without problems and the operator comfort of the state of the art is retained. Compared to the state of the art, installation space and costs are also not increased.

The object of the invention combines the functions of nut-spindle mounting and sliding
force and torque support Materials with a low coefficient of friction book, such as plastic, bronze and casting, are used for the function of mounting the nut-spindle.

Preferably, materials of high strength, such as filled plastics or metallic materials, are used to fulfill the function of force and torque support.

In its simplest construction, the motion nut consists of a basic body, containing two material components, for example, an internal thread region, consisting of nylon with carbon fibers, connected with an outer nylon part containing glass fibers and surrounding the internal thread region.

Mechanical car jacks are preferably equipped with such motion nuts, so that they are enclosed by a circumference of protection. If necessary, more than two material components can also be used; however, this may have a slightly disadvantageous effect on the cost situation.

The torsion- and tension-resistant connection of the two partial components (internal thread region and outer part) is brought about, for example, by longitudinal ribs or by thread-like ribs, which extend in the circumferential direction and may be integrally molded at the internal thread region and/or the outer part. Alternative embodiments, namely grooves in this internal thread region and/or outer part, are, of course, also conceivable. All customary cross-sectional variations (round, angular or the like) can be used as profiles for such groove-like depressions or ribs.

The object of the invention is distinguished owing to the fact that a material with good sliding properties and appropriate strength is used for the internal thread region and a material of very high strength and stiffness is used for the outer part.

BRIEF DESCRIPTION OF THE DRAWINGS

The object of the invention is described in the following by means of an example and represented in the drawing, in which.

DESCRIPTION OF THE PREFERRED EMBODIMENTS

Figure 2:
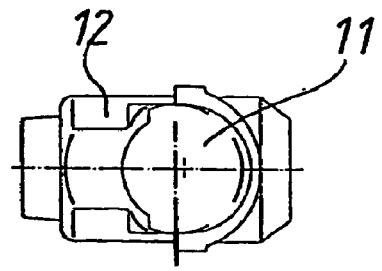
FIG. 1 shows a mechanical car jack in various lifting positions and FIG. 2 shows a motion nut for the car jack of FIG. 1 in various views.
Figure 1:
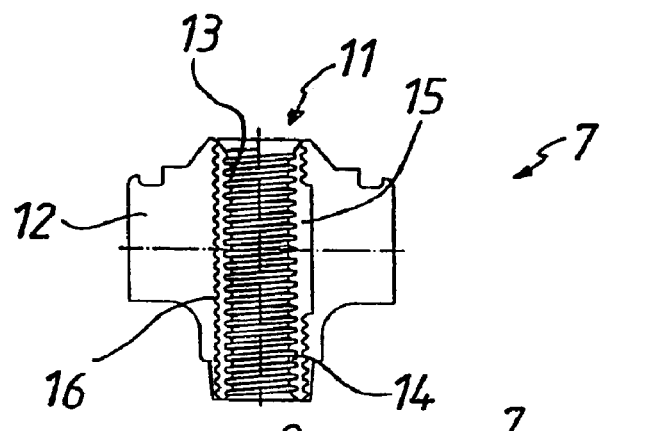
Figure 1:
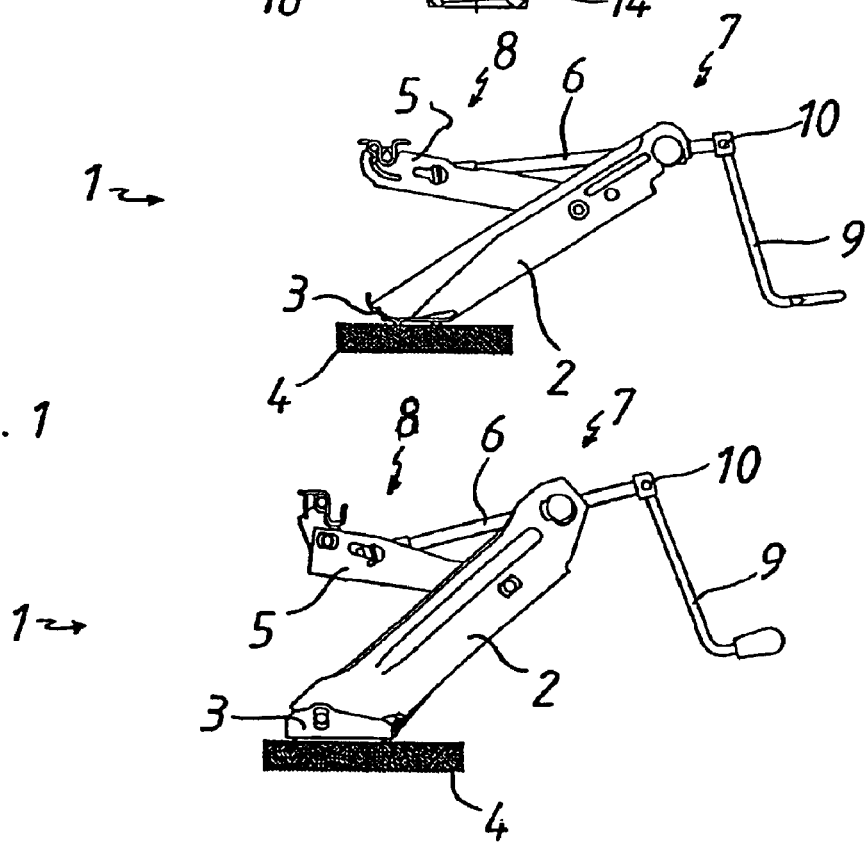

The inventive car jack 1 comprises a platform leg 2, which can be set down on level ground 4 by means of a foot 3. The platform leg 2 is connected with a pivotable supporting harm 5. A threaded spindle 6 extends between the free and region of the platform leg 2 and the supporting arm 5, a basic body 7, in the form of a motion nut being provided on the platform leg side and a counter-bearing 8 being provided on the supporting arm side. The supporting arm 5 can be moved up or down relative to the platform leg 2 over a crank handle of 9, which is connected over a connecting piece 10 with the threaded spindle 6.

FIG. 2 shows the inventive motion nut 7 in different views.

The motion nut 7 is formed by a basic body, containing two material components, namely and internal thread region 11 and an external part 12 surrounding the internal thread region 11. The latter contains the internal thread 13, which accommodates the threaded spindle 6, and is produced by injection molding form a nylon containing a proportion of carbon fibers. Rib-like projections, on the one hand, in the form of ribs 15 extending in the longitudinal direction, and as thread-like profiles 16, extending in the peripheral direction, are integrally molded to the outer periphery 14 of the internal thread region 11. The outer part 12, which is molded in a second step, for example, by injection molding, about the internal thread region 11, consists of nylon with a proportion of glass fibers. The rib-like projections 15, 16 accordingly form a connection, resistant to torsion and tension, between the two partial components 11, 12. The material, selected for the internal thread region 11, ensures the mounting and sliding function of the nut-spindle, whereas the material, selected for the outer part 12, ensures the force and torque support, for example, at the platform leg 2.

The selection of other materials, depending on the case for which they are to be used, is also conceivable. Alternatively, bronze or cast alloys can be used for the internal thread region 11. Furthermore, a plastic with an alternative reinforcing material, such as carbon fibers, aramide, mineral fibers or metal fibers, can be used as material for the internal thread region 11. Alternatively or additionally, lubricants such as PTFE, graphite, silicone, or PE can be admixed with the plastic.

Reinforcing materials, such as fibers of glass, carbon, aramide, boron, ceramic, and/or fabric can be added to the outer part 12.

The distance between the profile, extending in the peripheral direction, extends here approximately to the lead of the internal thread 13.

List of Reference Symbols 1. car jack
2. platform leg
3. foot
4. ground
5. supporting arm
6. threaded spindle
7. motion nut
8. counter-bearing
9. jack handle
10. connecting piece
11. internal thread region
12. outer part
13. internal thread
14. outer periphery
15. ribs
16. thread-like profiles

What is claimed is:

1. A motion nut for a lifting device, especially a car jack, comprising: a basic body having an internal thread; a threaded spindle seated in said internal thread; said basic body together with said internal thread being a single unit component formed of at least two separate material components of different materials comprising an internal thread region component part and an external part, so that properties of said internal thread region being selectable different from properties of said external part, said properties of said thread being selectable for reduced friction and said properties of said external part being selectable for increased strength and stiffness.

2. The motion nut as defined in wherein claim 1, wherein said internal thread region is sleeve-shaped and formed of filled plastic.

3. The motion nut as defined in claim 1, wherein said internal thread region is sleeve-shaped and formed of a bronze alloy.

4. The motion nut as defined in claim 1, wherein said internal thread region is sleeve-shaped and formed of nylon material with a specific carbon fiber content.

5. The motion nut as defined in claim 1, wherein said external part surrounds said internal thread region for forming said basic body, said external part comprising a high strength material.

6. The motion nut as defined in claim 1, wherein said external part of said basic body surrounds said internal thread region and comprises nylon material with a specific glass fiber content.

7. The motion nut as defined in claim 1, wherein said internal thread region and said external part are of injection-molded plastic, said internal thread region being sleeve-shaped and surrounded by said external part.

8. The motion nut as defined in claim 1, including means for preventing rotation between said internal thread region and said external part.

9. The motion nut as defined in claim 8, wherein said means for preventing rotation between said internal thread region and said external part comprising rib-shaped projections in a longitudinal direction of said internal thread region.

10. The motion nut as defined in claim 9, wherein said rib-shaped projections are in rounded or angular form.

11. The motion nut as defined in claim 1, wherein said internal thread region is formed of plastic containing lubricants.

12. The motion nut as defined in claim 1, wherein PTFE is included as a lubricant.

13. A lifting device, especially a mechanical car jack, comprising: at least one stand member and at least one lifting member; a basic body formed by a motion nut and a counter bearing and connecting said stand member with said lifting member; a threaded spindle received by said basic body; said motion nut having at least two separate material components of different materials and comprising an internal threaded region and an external part, so that properties of said internal thread region being selectable different from properties of said external part, said properties of said thread being selectable for reduced friction and said properties of said external part being selectable for increased strength and stiffness.

14. The lifting device as defined in claim 13, wherein said internal thread region is formed of plastic with a specific carbon fiber content and is surrounded by said external part formed of plastic with a specific glass fiber content.

15. The lifting device as defined in claim 13, wherein said internal thread region comprises nylon with a specific carbon fiber content and said external part comprises nylon with a specific glass fiber content, said motion nut being formed by said internal thread region and said external part.

16. The lifting device as defined in claim 13, including means for preventing rotation between said internal thread region and said external part and comprising rib-shaped projections.

17. The lifting device as defined in claim 13, wherein said motion nut comprises an injection-molded part.

18. The lifting device as defined in claim 13, wherein said internal thread region is formed of plastic containing lubricants.

19. The lifting device as defined in claim 18, wherein PTFE is included as a lubricant.

20. A motion nut for a lifting device, especially a car jack, comprising: a basic body having an internal thread; a threaded spindle seated in said internal thread; said basic body together with said internal thread being a single unit component formed of at least two separate material components of different materials comprising an internal thread region component part and an external part, so that properties of said internal thread region being selectable different from properties of said external part, said properties of said thread being selectable for reduced friction and said properties of said external part being selectable for increased strength and stiffness; said external part surrounding said internal thread region and being comprised of injection molded plastic; means for preventing rotation between said internal thread region and said external part and being formed of rib-shaped projections in a longitudinal direction of said internal thread region, said rib-shaped projections being rounded or angular-shaped.

* * * * *